United States Patent
Liu et al.

(10) Patent No.: US 10,482,905 B2
(45) Date of Patent: Nov. 19, 2019

(54) MAGNETIC CORE AND COIL DESIGN FOR DOUBLE PERPENDICULAR MAGNETIC RECORDING (PMR) WRITERS

(71) Applicant: Headway Technologies, Inc., Milpitas, CA (US)

(72) Inventors: Kowang Liu, Fremont, CA (US); Yuhui Tang, Milpitas, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/942,640

(22) Filed: Apr. 2, 2018

(65) Prior Publication Data
US 2019/0304490 A1    Oct. 3, 2019

(51) Int. Cl.
| | | |
|---|---|---|
| *G11B 5/127* | (2006.01) | |
| *G11B 5/265* | (2006.01) | |
| *G11B 5/17* | (2006.01) | |

(52) U.S. Cl.
CPC .............. *G11B 5/1278* (2013.01); *G11B 5/17* (2013.01); *G11B 5/2651* (2013.01); *G11B 5/2652* (2013.01)

(58) Field of Classification Search
CPC ....... G11B 5/1278; G11B 5/17; G11B 5/2651; G11B 5/2652
See application file for complete search history.

(56) References Cited

U.S. PATENT DOCUMENTS

| | | | |
|---|---|---|---|
| 7,907,360 | B2 | 3/2011 | Mak et al. |
| 8,405,930 | B1 * | 3/2013 | Li .................. G11B 5/1278 29/603.14 |
| 9,171,561 | B1 | 10/2015 | Gadbois et al. |
| 9,202,490 | B2 * | 12/2015 | Zuckerman .......... G11B 5/4866 |
| 9,361,912 | B1 * | 6/2016 | Liu ................ G11B 5/187 |
| 9,361,923 | B1 * | 6/2016 | Liu ................ G11B 5/3116 |
| 9,387,568 | B1 | 7/2016 | Ilaw et al. |
| 9,508,364 | B1 * | 11/2016 | Tang ............... G11B 5/112 |
| 9,613,642 | B1 | 4/2017 | Erden et al. |

(Continued)

OTHER PUBLICATIONS

Co-pending US Patent HT17-028, U.S. Appl. No. 15/912,821, filed Mar. 6, 2018, by Yuhui Tang et al., "Designs for Multiple Perpendicular Mangetic Recording (PMR) Writers and Related Head Gimbal Assembly (HGA) Process," 49 pgs.

*Primary Examiner* — Brian E Miller
(74) *Attorney, Agent, or Firm* — Saile Ackerman LLC; Stephen B. Ackerman

(57) ABSTRACT

A dual perpendicular magnetic recording writer is disclosed wherein the better of two writers on a slider is determined by performance testing, and is then integrated into a head gimbal assembly. Main pole layers in the two writers are separated by a cross-track width <10 microns to minimize read-write offset. Each of the driving coil (DC) and bucking coil (BC) have two outer portions forming a U shape with a front side, and each have a center portion connected to the front side proximate to an air bearing surface and a backend contacting an interconnect. A write current passes from a BC outer portion below the main pole in the selected writer through the BC center portion to the interconnect, and then through the DC center portion to a DC outer portion above the main pole in the selected writer. Area density capability mean and sigma are improved.

16 Claims, 12 Drawing Sheets

(56) References Cited

U.S. PATENT DOCUMENTS

| | | | |
|---|---|---|---|
| 9,805,744 B1* | 10/2017 | Xue | G11B 5/3116 |
| 2006/0145721 A1 | 7/2006 | Ton-Churo | |
| 2010/0254042 A1* | 10/2010 | Contreras | G11B 5/1278 |
| | | | 360/123.05 |
| 2017/0148473 A1* | 5/2017 | Wei | G11B 5/315 |
| 2017/0256275 A1 | 9/2017 | Hutchinson et al. | |

* cited by examiner

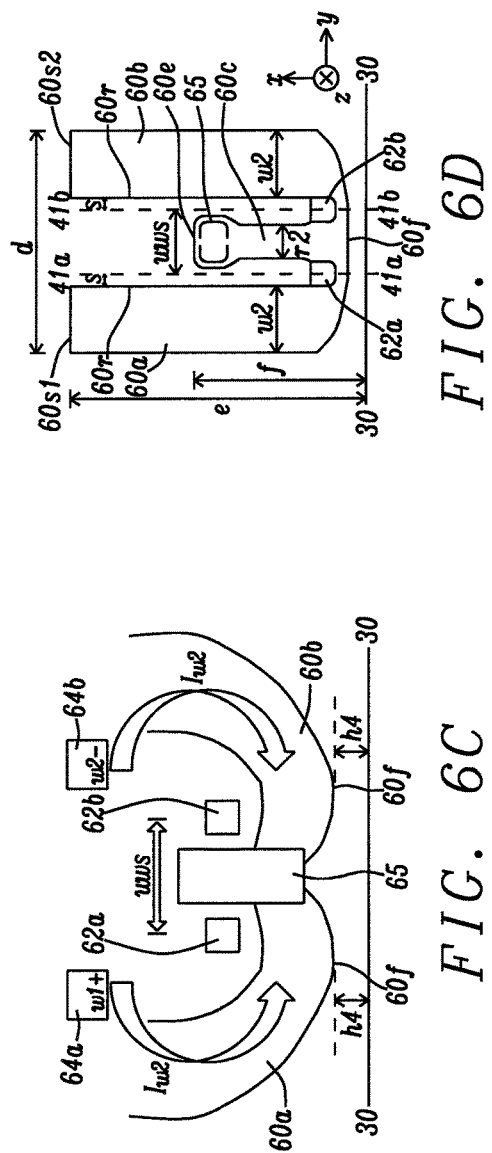
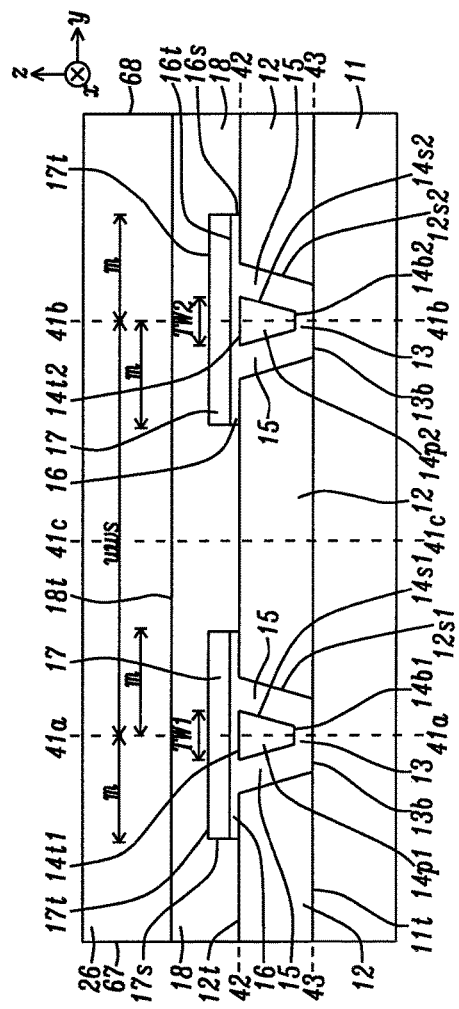
FIG. 6C
FIG. 6D
FIG. 7

MAGNETIC CORE AND COIL DESIGN FOR DOUBLE PERPENDICULAR MAGNETIC RECORDING (PMR) WRITERS

RELATED PATENT APPLICATION

This application is related to the following: Ser. No. 15/912,821, filing date 3/6/18; which is assigned to a common assignee and herein incorporated by reference in its entirety.

TECHNICAL FIELD

The present disclosure relates to a PMR write head that is configured to have two writers per slider, and in particular to a magnetic core and coil design that enables the better of the two writers to be selected for seamless integration into a head gimbal assembly (HGA) in a hard disk drive (HDD) with minimal thermal-mechanical implications and system-level issues.

BACKGROUND

Perpendicular magnetic recording has been developed in part to achieve higher recording density than is realized with longitudinal recording devices. A PMR write head typically has a main pole layer with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop. The trailing loop has a trailing shield structure with first and second trailing shield sides at the ABS. The second (PP3) trailing shield arches over the write coils and connects to a top yoke that adjoins a top surface of the main pole layer near a back gap connection. The leading loop includes a leading shield with a side at the ABS and that is connected to a return path (RTP) proximate to the ABS. The RTP extends to the back gap connection (BGC) and enables magnetic flux in the leading loop pathway to return from the leading shield at the ABS and through the BGC to the main pole layer. A PMR head has a great advantage over LMR in providing higher write field, better read back signal, and potentially much higher areal density.

The double write shield (DWS) design that features the leading and trailing loops was invented for adjacent track erasure (ATE) improvement by reducing stray field in side shields and in the leading shield. Magnetic flux is able to flow evenly through the leading loop and trailing loop. In the trailing loop, there is a hot seed (HS) layer that is a magnetic layer with high saturation magnetization from 19 to 24 kG formed between a top surface of the write gap and a bottom surface of the first trailing shield at the ABS. A good HS response is required to reduce stray fields in the side shields and leading shield.

Perpendicular magnetic recording has become the mainstream technology for disk drive applications beyond 150 Gbit/in$^2$. With the growing demand for cloud storage and cloud-based network computing, high and ultra high data rate recording becomes important for high-end disk drive applications. Thus, it is essential to design a PMR writer that can achieve high area density capability (ADC) in addition to improved stray field robustness characterized by low ATE and a bit error rate (BER) of about $10^{-6}$.

In today's PMR heads, the critical dimensions (CDs) of the PMR writer such as the track width (TW) are within a 10 nm to 100 nm range. However, the capabilities of process tools and variations in writer CDs have not been keeping up with the reductions in CDs. As a result, there are typically large fluctuations in writer performance, which impact both HGA yield and subsequent HDD yield. Thus, there is a need for an improved PMR writer design that minimizes variations in writer performance without having adverse thermal-mechanical implications or system level integrations issues.

SUMMARY

One objective of the present disclosure is to provide a PMR writer design wherein PMR write performance is improved compared with a single write head configuration, and that is compatible with current write head protrusion requirements and does not introduce new integration issues in a HDD structure.

Another objective of the present disclosure is to provide a PMR writer design according to the first objective with a process flow that does not require any new steps in the fabrication sequence.

These objectives are achieved by configuring a PMR writer with two writers per slider so that the better of the two writers may be selected during backend slider/HGA level performance testing, and subsequently integrated into HGAs and Head-Stack Assembly (HSA) for state of the art HDDs. According to one embodiment of the symmetric double writer core and coil design disclosed herein, each of the writers features a main pole layer in which flux is generated by flowing a current through a separate pathway in a set of bucking and driving coils wherein a center bucking coil portion and a center driving coil portion contact an interconnect to enable opposite polarity in the magnetic flux direction. The two main poles are separated by a writer-to-writer cross track spacing (WWS) that is preferably less than 10 microns such that the read-write offset (RWO) in the cross-track direction may be minimized. There may be one reader or multiple readers proximate to the center track position below the double writer structure in a combined read/write head scheme.

During a write process in the first writer, when the write gate in the pre-amp is switched to "ON", write current flows from the W1+ pad in the counter-clockwise direction within a first outer portion of the first bucking coil (BC) and through the BC center portion to the interconnect, and then through the driving coil (DC) center portion into a DC first outer portion wherein the current has a clockwise direction to a W1− pad thereby energizing the first magnetic core and first main pole. In the second writer, current flows from the W2− pad in a clockwise direction within a BC second outer portion through the BC center portion to the interconnect, and then through the DC center portion into a DC second outer portion wherein the current has a counter-clock wise direction to the W2+ pad thereby energizing the second magnetic core and second main pole. To provide an acceptable WWS value, inner sides of the BC outer portion and DC outer portion in each writer have a smaller spacing from a first plane that bisects the first main pole (or a second plane that bisects the second main pole) compared with a conventional single writer scheme.

Outer sides of each outer portion in the bucking and driving coils may have a similar cross-track distance from the first (or second) plane as in a single writer so that the bucking coil and driving coil have a similar footprint in the width (cross-track) and height (orthogonal to ABS) directions compared a bucking coil and driving coil design in a single writer. Accordingly, the existing positions of the dynamic flying height (DFH) heaters in the read head and write head may be retained without any adverse consequences in the write gap protrusion/read gap protrusion ratio.

Because of the aforementioned coil design, magnetic writing functionality in each of the first and second writers is similar to that of a single writer. In other words, the driving coil and bucking coil configuration is guaranteed to have opposite polarity in the magnetic flux direction no matter which of the two writers is selected to be integrated into the HGA.

A process sequence for fabricating a dual writer configuration is provided and comprises a similar set of process steps as used in making a single writer.

BRIEF DESCRIPTION OF THE DRAWINGS

FIG. 6C shows a top-down view of a bucking coil design in a dual PMR writer scheme where each writer has a separate bucking coil connected to a center interconnect according to an embodiment of the present disclosure.

FIG. 6D shows one embodiment of a bucking coil design for FIG. 6C where a BC center portion contacts the center interconnect at one end, and connects with a BC first outer portion in a first writer and with a BC second outer portion in a second writer at a front side proximate to the ABS.

FIG. 7 is an ABS view of a dual PMR writer scheme wherein two main poles are separated by a WWS distance, and share a single trailing shield and leading shield at the ABS according to an embodiment of the present disclosure.

DETAILED DESCRIPTION

Figure 1:
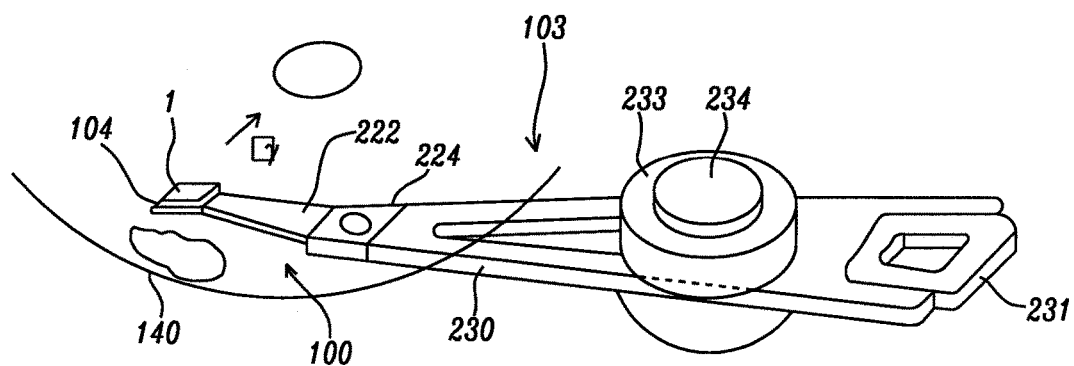
FIG. 1 is a perspective view of a head arm assembly of the present disclosure.

The present disclosure relates to a dual PMR writer wherein the writer having a better performance is selectively integrated into a HGA assembly while the other writer does not have an electrical connection to activate functionality therein. Each writer has a separate DC outer portion and separate BC outer portion, but the writers share a BC center portion and a DC center portion where each center portion contacts an interconnect at one end and is proximate to the ABS at the other end. In the drawings, the y-axis is a cross-track direction, the z-axis is a down-track direction, and the x-axis is in a direction orthogonal to the ABS and towards a back end of the device. Dimensions of writer components are expressed as a width in the cross-track direction, height in the x-axis direction, and thickness in the down-track direction. The term "behind" when used to describe a first layer "behind" a second layer means the first layer is a greater distance from the ABS than the second layer.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
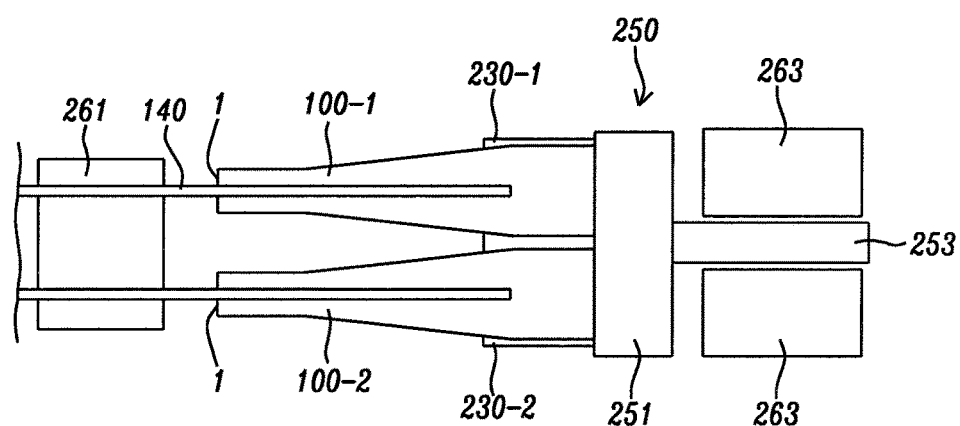
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251.

The voice coil motor has a permanent magnet 263 arranged at an opposite position across the coil 231.

Figure 3:
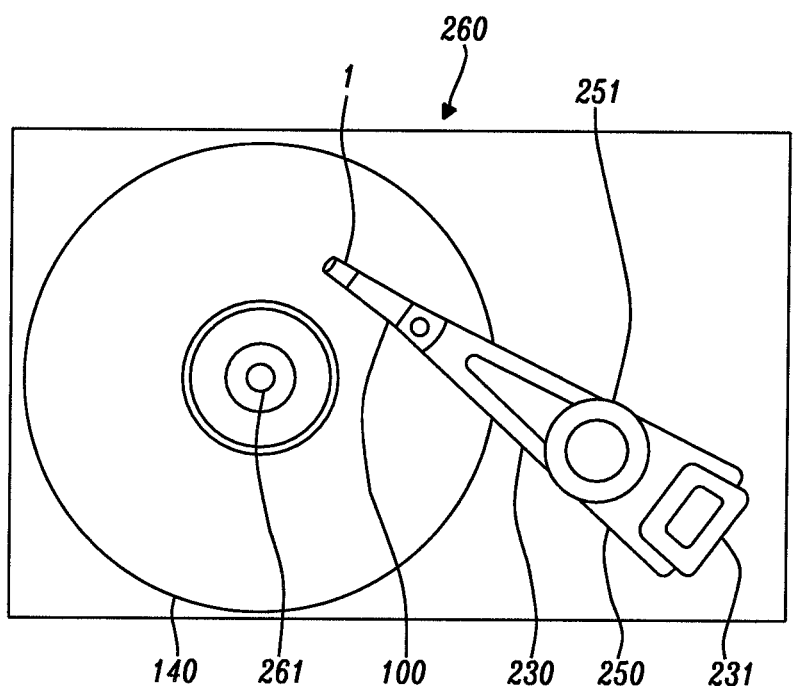
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
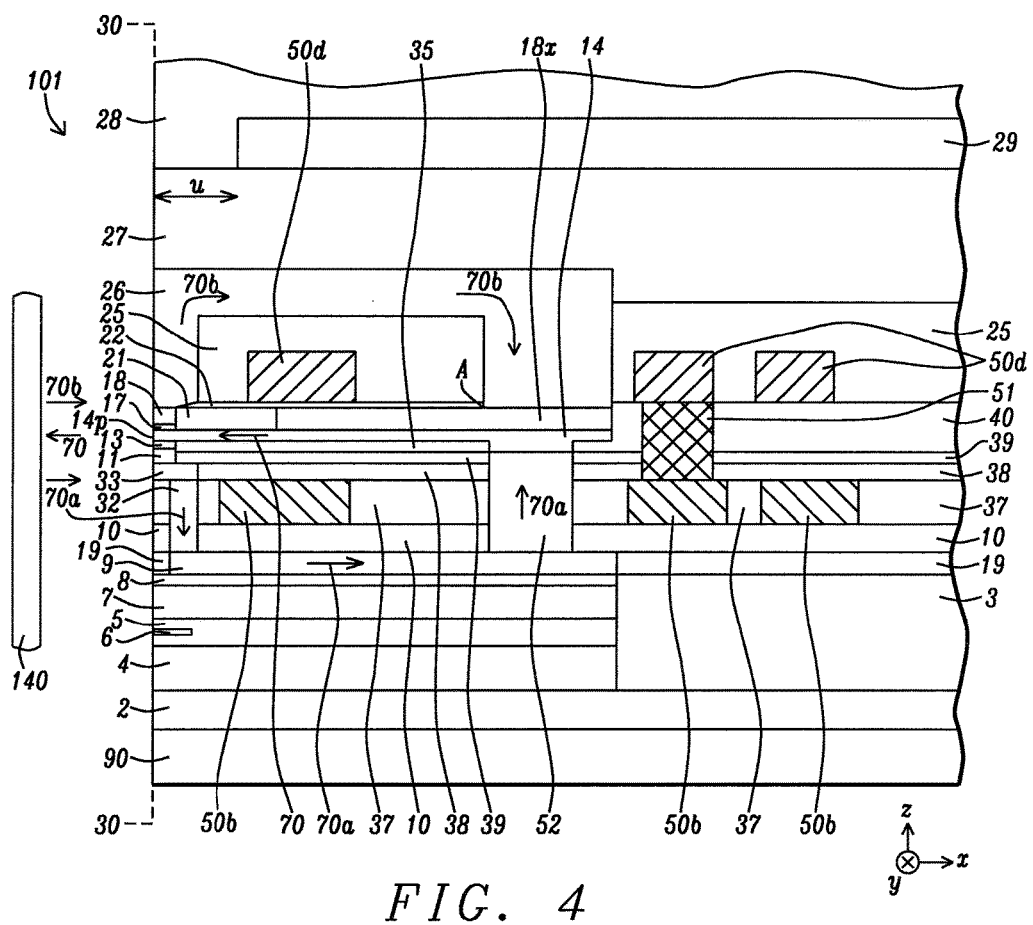
FIG. 4 is a down-track cross-sectional view showing a single PMR writer with a double write shield (DWS) configuration according to a current process of record (POR) practiced by the inventors.

Referring to FIG. 4, a single PMR writer with a combined read head/write head structure currently fabricated by the inventors is depicted in a cross-sectional view from a plane that is orthogonal to an air-bearing surface (ABS) 30-30. The combined read/write head is formed on a substrate 90 that may be comprised of AlTiC (alumina+TiC). Those skilled in the art will recognize that layers 2-8 represent the read head portion of the recording device while overlying layers represent the write head portion. The substrate is typically part of a slider (not shown) formed in an array of sliders on a wafer. After the combined read/write head is completed, the wafer is sliced to form rows of sliders. Each row is typically lapped to afford an ABS before dicing to fabricate individual sliders for a HDD.

The present disclosure anticipates that one or more dynamic fly height (DFH) heater elements (not shown) may be formed in one or more insulation layers in the PMR writer structure to control the extent of thermal expansion (protrusion) along the ABS 30-30 toward a magnetic medium 140 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input. Usually, the RG protrusion/WG protrusion ratio (gamma ratio) is around 1 to provide the best read/write performance and reliability. The DFH heater in the writer is often positioned in one or more of the dielectric layers 38-40 behind interconnect 51 and between bucking coil 50b and driving coil 50d to yield the desired gamma ratio.

A first insulation layer 2 that may be comprised of alumina or another dielectric material is disposed on substrate 90. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensor 6 may be an insulator such as MgO in a tunneling magnetoresistive (TMR) sensor.

Magnetic layer 7, insulation layer 8, and RTP 9 are sequentially formed on the read gap 5. In some embodiments, the RTP serves as the S2B shield in the read head while magnetic layer 7 is the S2A shield. In other embodiments, magnetic layer 7 is a top read shield layer having a stack represented by S2A shield/insulation layer/S2B shield. S2A and S2B layers may be made of the same magnetic material as in the S1 shield 4. Insulation layer 8 may be the same dielectric material as in insulation layer 2. Although RTP 9 is recessed from the ABS and formed within insulation layer 19, the RTP may serve as a flux return pathway in the writer by magnetically connecting S2C 32 with back gap connection (BGC) 52 in leading loop pathway 70a that includes leading shield 13, leading shield connector (LSC) 33, shield section (S2C) 32, the RTP, and the BGC.

A bottom portion of BGC 52 contacts a top surface of RTP 9, and a top BGC surface contacts a back portion of the bottom surface of main pole 14. In the exemplary embodiment, there is a first insulation layer 10 formed on the RTP and adjoining the sides of S2C 32, and contacting the sides of a bottom portion of the BGC. A second insulation layer 37 is formed on the first insulation layer and has bucking coil 50b and a middle BGC portion formed within. Here, the bucking coil has one turn that is completely displayed in the top-down view in FIG. 5B. The bucking coil is wound in series with an opposite polarity to that in the driving coil 50d in FIG. 5A to minimize direct coupling between the trailing shield 18 and driving coil. Note that the down-track cross-sectional view in FIG. 4 is taken along plane 47-47 in FIG. 5A showing a top-down view of the driving coil, or along plane 47-47 in FIG. 5B that illustrates a top-down view of the bucking coil.

Returning to FIG. 4, a third insulation layer 38 is formed on insulation layer 37 behind LSC 33 and a fourth insulation layer 39 is on insulation layer 38 behind leading shield 11. Generally, insulation layers 10, 37-39 have a combined thickness essentially equal to that of BGC 52. The LSC, S2C 32, BGC, and RTP 9 may be made of NiFe, CoFe, CoFeNi or the like with a saturation magnetization value of 10 kiloGauss (kG) to 16 kG.

There may be a bottom yoke 35 behind lead gap 13 and with a thickness essentially equal to that of the lead gap. Above the bottom yoke is the main pole layer 14 (with pole tip 14p at the ABS 30-30) that may be comprised of NiFe, CoFe, CoFeNi, or CoFeN, and is preferably a 19 kG or 24 kG material. The main pole 14 has a back portion that connects with a top surface of BGC 52 to complete the leading loop. Leading shield (LS) 11 is separated from the main pole by lead gap 13. Flux 70 from the main pole enters magnetic medium 140 during a write process and returns in part as flux 70a though the leading loop comprised of LS 11, LSC 33, S2C 32, RTP 9, and the BGC.

A first trailing shield (TS) layer 17 also known as the hot seed layer has a bottom surface formed on a write gap (not shown) at the ABS and extends a throat height distance away from the ABS 30-30 to an ABS facing (front) side of non-magnetic layer 21. A second TS layer 18 also extends from the ABS to layer 21, and like the first TS layer, may be made of CoFeN, CoFeNi, NiFe, or CoFe and is part of the trailing loop. The trailing loop for flux 70b to return to main pole 14 further includes a third trailing shield portion named PP3 trailing shield 26 that arches over a front portion of driving coil 50d to connect with a back portion 18x of the second TS layer above the main pole back portion. TS layer 18/18x and the PP3 trailing shield are typically made of materials with a 16 kG to 19 kG magnetic saturation value. TS layer 18x is sometimes referred to as a top yoke, and has a backside at point A that touches the inner corner of PP3 26. Insulation layer 22 is formed on a portion of the non-magnetic layer 21 and top yoke.

Although PP3 trailing shield 26 arches over driving coil 50d with a dome shape, the PP3 trailing shield may have a substantially flat top surface in other designs. An insulation layer 25 is formed on the insulation layer 22 and fills the openings between the driving coil 50d and the PP3 trailing shield. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed a distance u to avoid introducing a material at the ABS with different mechanical and etch resistance properties than adjacent layers which could adversely affect back end lapping and ion beam etching processes. Overcoat layer 28 is formed as the uppermost layer in the write head.

The dual flux return pathway in the POR design is employed to reduce STE. Typically, about 50% of flux returns through leading loop 70a and about 50% through trailing loop 70b.

Figure 5B:
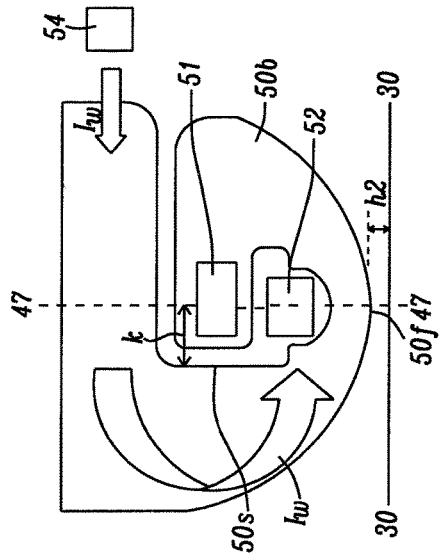
FIG. 5B is a top-down view showing the write current in FIG. 5A originating from a pad that flows counterclockwise in a bucking coil to the interconnect in the single PMR writer.
Figure 5A:
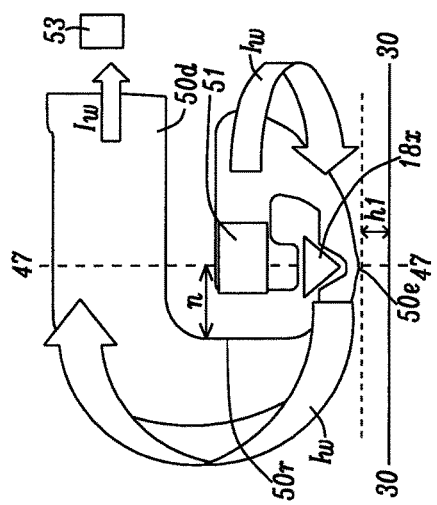
FIG. 5A is a top-down view showing write current flowing from an interconnect through a main driving coil to a pad thereby generating magnetic flux in a magnetic core and overlying main pole (not shown) in a single PMR writer.

Referring to FIG. 5B, a top-down view of bucking coil 50b is depicted to show the flow of write current 6 from a W+ pad 54 through the bucking coil in a counter-clockwise direction around BGC 52 to a bottom side of interconnect (via) 51. A front side 50f of the bucking coil is recessed to height h2 from ABS 30-30. The write current continues from a top side of the interconnect into driving coil 50d in FIG. 5A and proceeds to flow in a clockwise direction to a W– pad 53 in the suspension circuitry in the HGA assembly (not shown). The write current energizes the magnetic core comprised of TS shield 18x and the underlying main pole (not shown). Preferably, the main pole delivers magnetic flux and field necessary to create a sharp transition with high field gradient on one or more bits in a magnetic medium 140 in FIG. 4.

As mentioned previously, when track width (TW) shrinks below 100 nm for a single writer, there is often considerable variation in performance from one writer to the next for a given target TW. We have found that with a dual writer design of the present disclosure, there is a substantial improvement in both ADC mean and sigma values than observed for the single PMR writer POR design.

Figure 6B:
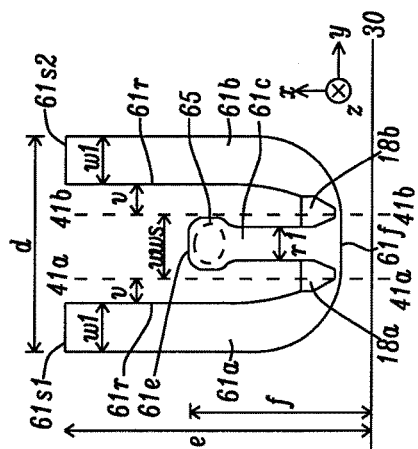
FIG. 6B shows one embodiment of a driving coil design for FIG. 6A where a DC center portion contacts the center interconnect at one end, and connects with a DC first outer portion in a first writer and with a DC second outer portion in a second writer at a front side proximate to the ABS.
Figure 6A:
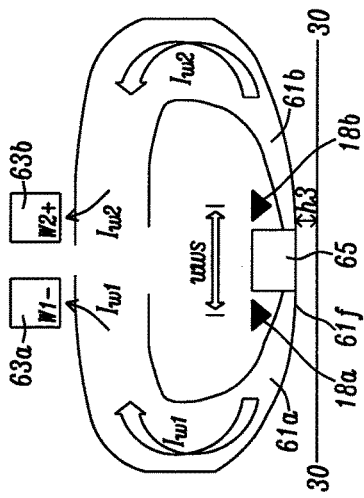
FIG. 6A shows a top-down view of a driving coil design in a dual PMR writer scheme where each writer has a separate driving coil connected to a center interconnect according to an embodiment of the present disclosure.

Referring to FIG. 6A and FIG. 6C, a general scheme is provided for write current flow in a dual PMR writer. At the driving coil level in FIG. 6A and the bucking coil level in FIG. 6C, there is a writer-to-writer spacing (WWS) in the cross-track direction between a center of BGC 62a in a first writer and a center of BGC 62b for a second writer. WWS also represents the distance between the midpoints of a first main pole layer formed on BGC 62a and a second main pole layer formed on BGC 62b described later with respect to FIG. 7 and FIGS. 8A-8C. When the write gate in the preamp of the HGA assembly (shown in FIG. 9) is switched to "ON", write current Iw1 flows from W1+ pad 64a in a counterclockwise direction through bucking coil 60a to interconnect 65 (FIG. 6C) and then in a clockwise direction from the interconnect through driving coil 61a to W1– pad 63a (FIG. 6A) to energize the magnetic core comprised of TS shield portion 18a and the underlying first main pole layer (not shown) in the first writer. Alternatively, when writing with the second writer, write current Iw2 flows from W2– pad 64b in a clockwise direction through bucking coil 60b to interconnect 65 (FIG. 6C) and then in a counter-clockwise direction through driving coil 61b to W2+ pad 63b (FIG. 6A) thereby energizing TS shield portion 18b and the underlying second main pole layer (not shown). Driving coil 61a (or 61b) has a front side 61f recessed to height h3 from the ABS while bucking coil 60a (or 60b) has a front side 60f that is recessed to a height h4 from the ABS.

It should be understood that in the final device, only one of the two writers (that has a better performance during backend testing) is integrated into a HGA for customer use. The other writer remains in the device but the writer pads W1+/W1– or the writer pads W2+/W2– are not connected to the suspension circuitry and the preamp. The method of selecting the better writer in a dual PMR writer scheme is described in detail in related patent application Ser. No. 15/912,821.

Referring to FIG. 6B and FIG. 6D, a first embodiment of a magnetic core and coil design of the present disclosure is depicted. In FIG. 6B, there is a driving coil design wherein outer portions 61a, 61b have backends 61s1, 61s2, respectively, and converge at front side 61f that is between plane 41a-41a and 41b-41b to form a substantially U shape. There is also a center portion 61c having cross-track width r1, where r1<WINS, that connects with the U shape proximate to front side 61f and extends to a height f at end 61e in a substantially rectangular shape. In the exemplary embodiment, the cross-track width of the rectangular shape is greater at backend 61e to enable contact with an entire top surface of interconnect 65.

Likewise in FIG. 6D, the bucking coil design may comprise two outer portions 60a, 60b having backends 60s1, 60s2, respectively, and converging at a front side 60f that is between plane 41a-41a and plane 41b-41b to form a substantially U shape. Center portion 60c has cross-track width r2, where r2<WWS, connects with the U shape proximate to front side 60f, and extends to a height f at backend 60e in a substantially rectangular shape. The center portion has a cross-track width that may be greater at end 60e to enable contact with an entire bottom surface of interconnect 65.

Preferably, both of the driving coil and bucking coil designs have a cross-track width d and height e similar to that of a single PMR writer so that thermal-mechanical behavior (WG/RG protrusion ratio proximate to 1) does not deviate from conventional writers. This condition is enabled when cross-track width r1 of the DC center portion is substantially less than cross-track width w1 of the DC outer portions 61a, 61b, and when cross-track width r2 of the BC center portion is substantially less than cross-track width w2 of BC outer portions 60a, 60b.

In FIG. 6D, BGC 62a for the first writer is bisected by plane 41a-41a that is orthogonal to the ABS 30-30, and BGC 62b for the second writer is bisected by plane 41b-41b which is parallel to plane 41a-41a and separated therefrom by the WWS distance. Likewise, in FIG. 6B, TS layer 18a in the first writer is bisected by plane 41a-41a and TS layer 18b in the second writer is bisected by plane 41b-41b. Moreover, each BGC is formed between BC center portion 60c and BC outer portion 60a (or 60b) in the first writer and second writer, respectively, proximate to front side 60f. In the driving coil, top surfaces of TS layer 18a and TS layer 18b are exposed between DC center portion 61c and DC outer portion 61a (or 61b) in the first writer and second writer, respectively, proximate to front side 61f. It should be understood that the shapes for the BGCs, TS layers, and coils are not limited to those depicted in FIG. 6B and FIG. 6D. In other words, the shapes for the magnetic core, driving coil, and bucking coil may be altered to optimize performance for PMR writer requirements that vary from one product to the next.

Expanding on the general write current scheme in FIGS. 6A, 6C to the more specific layout in FIGS. 6B, 6D, the write current (not shown) for generating flux in the first main pole layer (14p1 in FIG. 7) passes through BC outer portion 60a through BC center portion 60c to interconnect 65 (FIG. 6D) and then through DC center portion 61c to DC outer portion 61a (FIG. 6B). On the other hand, when the second main pole layer (14p2 in FIG. 7) is selected as the better writer, write current (not shown) for generating flux therein passes through BC outer portion 60b through BC center portion 60c to interconnect (FIG. 6D), and then through DC center portion 61c to DC outer portion 61b (FIG. 6B).

In FIG. 7, an ABS view is illustrated of the first writer with center plane 41a-41a that bisects first pole tip 14p1, and of the second writer with center plane 41b-41b that bisects second pole tip 14p2. First and second pole tips have track widths TW1 and TW2, respectively, and are shown with a trapezoidal shape but may have different shapes in other embodiments. The first writer with main pole layer 14a having the first pole tip is shown in a down-track cross-sectional view in FIG. 8A that is taken along plane 41a-41a. The second writer with main pole layer 14b having the second pole tip is shown in FIG. 8B, which is a down-track cross-sectional view along plane 41b-41b. In general, all PMR layers are retained from FIG. 4 except for the TS layers 18a/18b, bucking coils 60a/60b, driving coils 61a/61b, BGC 62a/62b, and main poles. The leading loop for flux return in the first writer comprises leading shield 11, RTP 9a, and BGC 62a while the leading loop in the second writer comprises leading shield 11, RTP 9b, and BGC 62b.

Returning to FIG. 7, the main pole layers share a common trailing shield 18 and leading shield 11 that is bisected by center plane 41c-41c, and each pole tip 14p1, 14p2 is surrounded by a gap layer that comprises leading gap 13, side gaps 15, and the write gap 16. There is a trailing shield (hot seed) layer 17 on each write gap. In one embodiment, each hot seed layer side 17s is coplanar with a write gap side 16s and formed a distance m from center plane 41a-41a in the first writer, and an equivalent distance m from center plane 41b-41b in the second writer. First and second pole tips have a top surface 14t1 and 14t2, respectively, at plane 42-42 that also includes a top surface 12t of side shield layers 12. First and second pole tips also comprise bottom surfaces 14b1, 14b2, respectively. Leading shield 11 has a top surface 11t at plane 43-43 which also includes a bottom surface of the leading gap. Planes 42-42 and 43-43 are parallel to each other and are orthogonal to the center plane. Side gaps adjoin inner sides 12s1, 12s2 of the side shields. In the exemplary embodiment, PP3 trailing shield 26 contacts a top surface of TS layer 18 at the ABS. However, in other embodiments, the PP3 trailing shield may be recessed behind the ABS. TS layer 18 contacts HS layer side 17s and top surface 17t, and write gap side 16s, and adjoins side shields 12 at plane 42-42. The all wrap around (AWA) shield design has outer sides 67, 68, and features side shields that adjoin the leading shield at plane 43-43.

In all embodiments, WWS is preferably less than 10 microns so that the read-write offset also known as RWO (sensor—pole tip 14p1 spacing, and sensor—pole tip 14p2 spacing) in the cross-track direction is minimized. For example, if the sensor 6 (FIG. 8A or FIG. 8B) is centered at center plane 41c-41c (FIG. 7), then RWO is effectively equal to ½ WWS. If RWO becomes too large, the thermal-mechanical behavior of the dual PMR writer will deviate significantly from conventional single PMR writers. In particular, it is important to maintain the WG protrusion/RG protrusion ratio and DFH heater placement found in current writers to avoid a substantial redesign of the dual writer structure. As RWO increases, WG protrusion decreases thereby increasing the risk of exposing the sensor to mechanical damage. Thus, the driving coil in FIG. 6B is designed to have inner sides 61r that are a cross-track distance v from plane 41a-41a (or plane 41b-41b) where v is preferably less than the cross-track distance n (FIG. 5A) between inner side 50r and center plane 47-47 in the single writer POR layout. Furthermore, the bucking coil in FIG. 6D is engineered to have inner sides 60r with a cross-track distance s from plane 41a-41a or plane 41b-41b where s is preferably less than the cross-track distance k (FIG. 5B) between inner bucking coil side 50s and plane 47-47. Moreover, widths r1 and r2 of coil center portions 61c, 60c, respectively, are preferably less than s and v to enable a smaller WWS. As a result, WG protrusion during a write process when DFH heating is applied is not substantially different for the first writer (or second writer) compared with WG protrusion in a single PMR writer such as the POR scheme in FIG. 4.

Figure 8A:
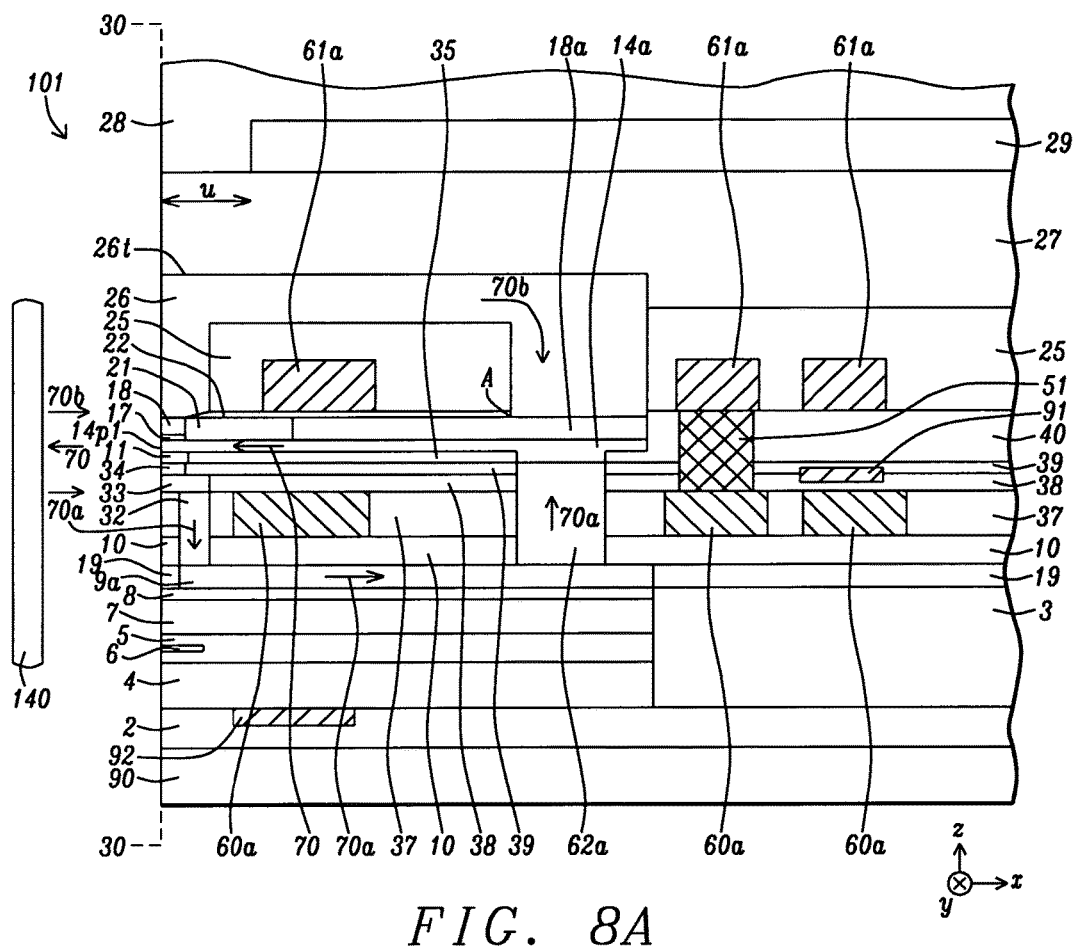
FIGS. 8A-8B are down-track cross-sectional views of the first writer and second writers, respectively, in FIG. 7 along a plane that bisects the first main pole layer (FIG. 8A), and along a plane that bisects the second main pole layer (FIG. 8B).
Figure 8B:
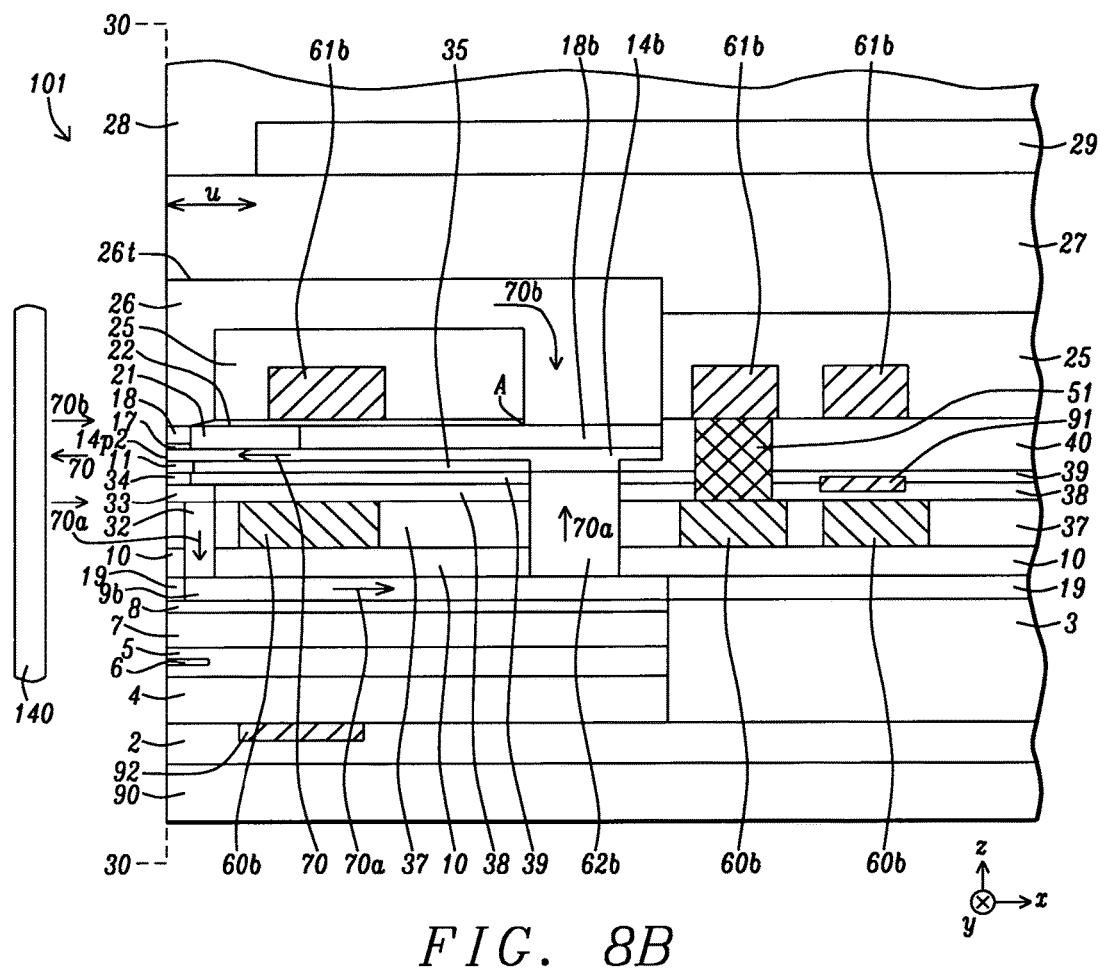

In FIGS. 8A-8B, the combined read/write head structure 101 has PP3 trailing shield 26 with a flat top surface 26t. In other embodiments, the top surface may retain the arch shape depicted in FIG. 4. Point A is the location where the ABS facing side of the PP3 trailing shield contacts TS layer 18a in the first writer or TS layer 18b in the second writer. In FIG. 8A, a first dynamic fly height heater (DFH1) 91 in the first writer is shown in a portion of dielectric layers 38, 39 that are between bucking coil 60a and driving coil 61a, and behind interconnect 51. A second dynamic fly height heater (DFH2) 92 may be formed in the reader and within insulation layer 2. FIG. 8B shows DFH1 91 in a portion of dielectric layers 38, 39 between bucking coil 60b and driving coil 61b, and behind interconnect 51 in the second writer while DFH2 92 is within insulation layer 2.

Figure 8C:
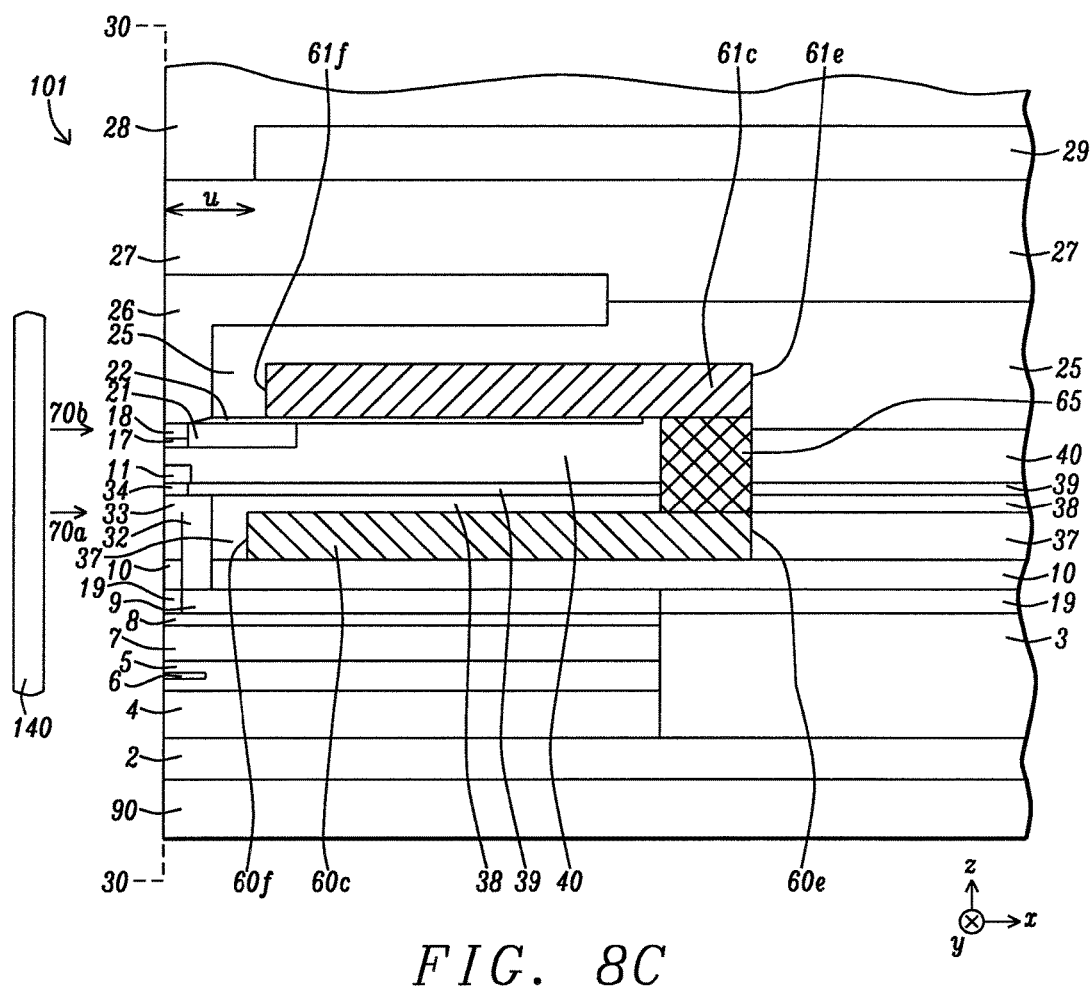
FIG. 8C is a down-track cross-sectional view along a center plane midway between the first writer and second writer in FIG. 7.

Referring to FIG. 8C, a down-track cross-sectional view along center plane 41c-41c in FIG. 7 is illustrated according to an embodiment of the present disclosure. Note that the trailing shield structure including PP3 trailing shield 26 is present along with leading shield structure including LSC 33, S2C 32, and RTP 9. However, TS layer 18a/18b and the BGC are absent at the center plane where the first writer adjoins the second writer. DC center portion 61c is shown with front side 61f and backend 61e, and BC center portion 60c is pictured with front side 60f and backend 60e. Interconnect 65 adjoins a bottom surface of DC center portion 61c proximate to backend 61e, and contacts a top surface of BC center portion 60c proximate to backend 60e. A DFH heater (not shown) may be placed in one or more of the dielectric layers 38-40 proximate to a backside of interconnect 65. There may also be a second DFH heater (not shown) in the read head portion such as in dielectric layer 3, for example.

Figure 9:
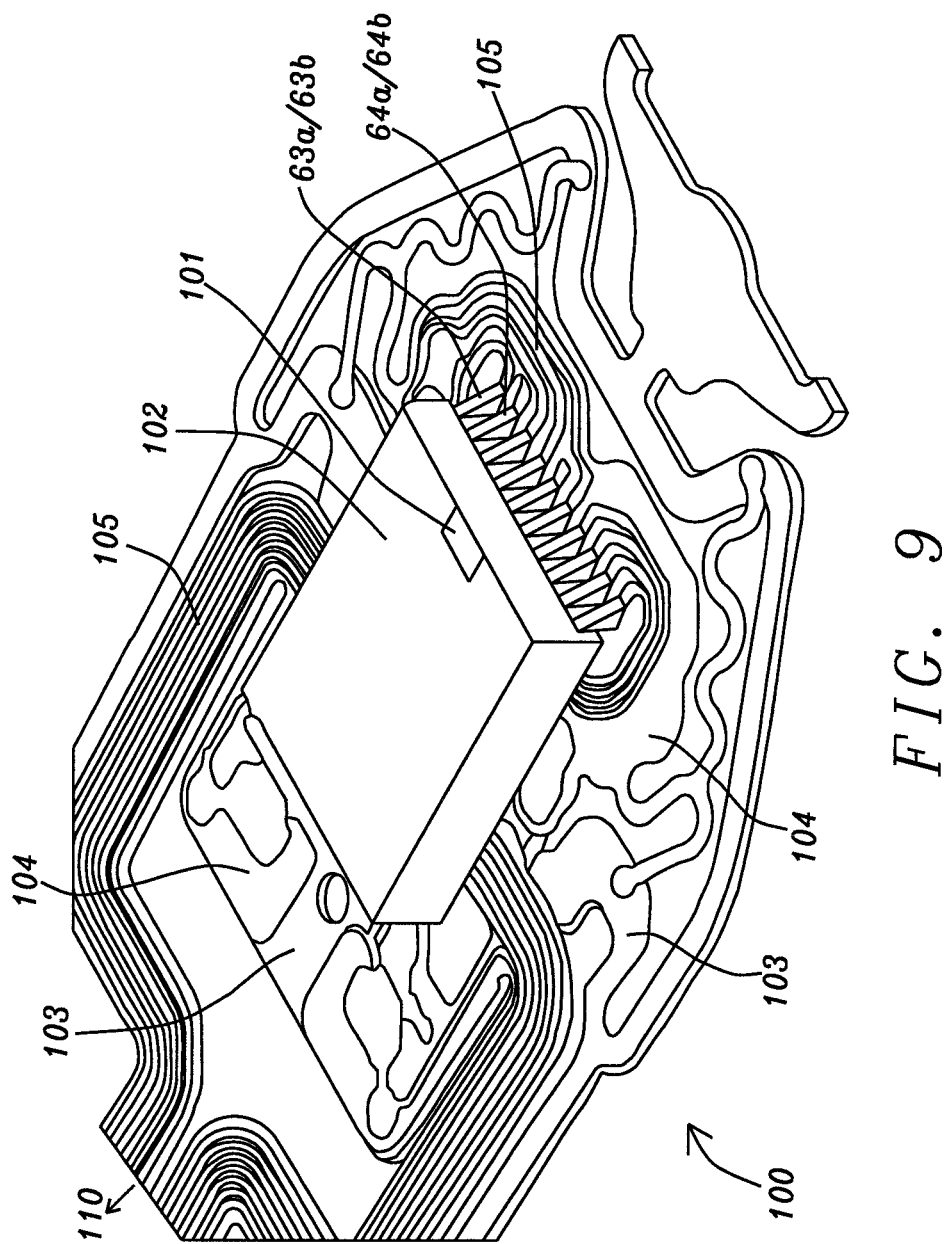
FIG. 9 is an oblique view of a slider on which a combined read/write head structure is mounted, and having adjoining pads and traces (wiring) formed on a suspension according to an embodiment of the present disclosure.

Referring to FIG. 9, HGA 100 is depicted and features suspension 103, an overlying dielectric layer 104, and slider 102 formed thereon. The combined read/write head 101 comprised of the dual PMR writer of the present disclosure adjoins a top side of the slider facing away from the suspension. Pads including W1− pad 63a (or W1+ pad 63b) and W2+ pad 64a (or W2− pad 64b) are attached to slider side 102s. Traces 105 connect the plurality of pads to preamp 110. Connections between the pads and the combined read/write head are within the slider and not visible from this view.

Figure 10:
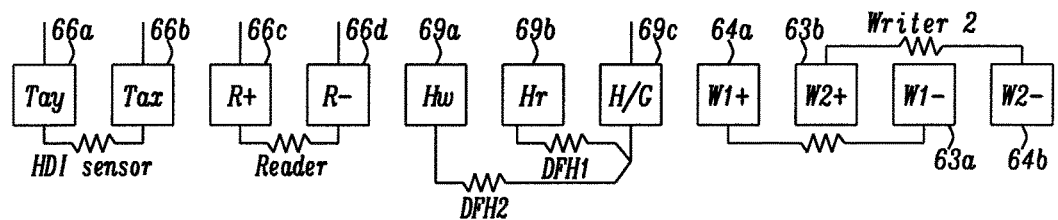
FIG. 10 is diagram showing one possible configuration for the plurality of pads on the slider in FIG. 9.

In FIG. 10, one embodiment of the pad layout is shown for a combined read/write head 101 having a single reader and a dual writer according to the present disclosure. Pads interface the writers, reader, two DFH heaters, and contact (HDI) sensors to the driving circuits through the trace lines in the HGA described previously. Pads 66a-66b control the contact sensor function, pads 66c-66d control the reader function, and pads 69a-69c are used to manage the two DFH heaters. After the better of the two writers is selected, only pads 63a, 64a or pads 63b, 64b are connected to traces 105 (FIG. 9) depending on whether the first writer or the second writer, respectively, is determined to have better performance. Accordingly, the total number of pads is nine when a dual independent DFH heater mode is employed as in FIG. 10. Alternatively, there may be a parallel DFH heater mode (not shown) where the total number of pads is only 8.

As discussed in more detail in related patent application Ser. No. 15/912,821, we find the mean ADC is improved by 2.4% and the sigma is tightened by 35.2% for a dual PMR writer of the present disclosure compared with a single writer with a POR design in FIG. 4. Since the overall footprint (d, e dimensions in FIG. 6B and FIG. 6D) of the bucking coil and driving coil is maintained in the dual PMR writer disclosed herein compared with a single writer, thermal-mechanical behavior is substantially the same as in state-of-the-art writers, and HDD applications in all mobile, near line, and high-end segments are maintained with essentially equal performance and reliability.

Figure 11:
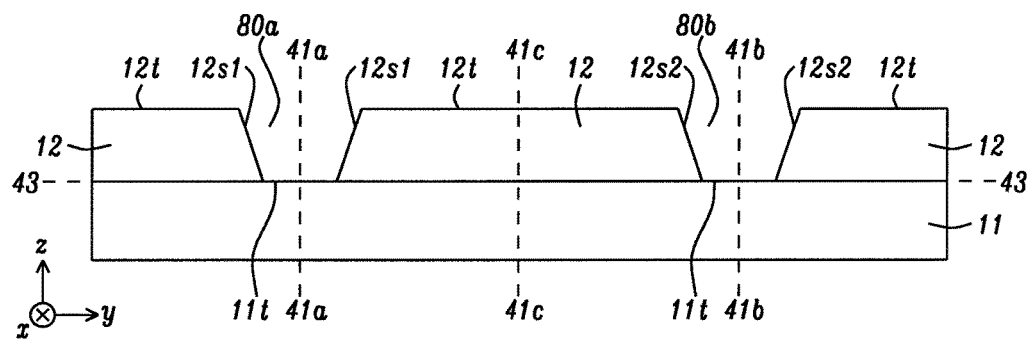
FIGS. 11, 12, 15, and 18 are ABS views depicting a series of process steps during the fabrication of the dual PMR writer shown in FIG. 7.

The present disclosure also encompasses a method of fabricating a dual PMR writer that is disclosed herein. In particular, the process sequence follows that of a conventional single PMR writer except for forming two main poles rather than one. A process flow is provided in FIGS. 11-18 and starts at the point where the AWA shield structure is constructed. Referring to FIG. 11, an ABS view is depicted of a side shield layer 12 deposited on leading shield 11 wherein the leading shield is formed on a substrate (not shown) comprising a bucking coil having two outer portions 60a, 60b, and a center portion 60c shown in FIGS. 8A-8C. The side shield layer has top surface 12t and is patterned by a conventional photolithography method followed by an ion beam etch (IBE) or reactive ion etch (RIE) process to form opening 80a with sidewalls 12s1 centered on plane 41a-41a, and opening 80b having sidewalls 12s2 centered on plane 41b-41b. As a result, leading shield top surface 11t at plane 43-43 is exposed in the openings. If a tapered leading side of the main pole layers is desired, a conventional IBE technique is performed at this point such that the top surface within the openings is no longer orthogonal to planes 41a-41a and 41b-41b.

In FIG. 11, a dielectric material is conformally deposited by a plasma enhanced chemical vapor deposition (PECVD) method or the like on the sides 12s1, 12s2 and top surface 11t to partially fill openings 80a, 80b. As a result, leading gap 13 is formed on top surface 11t and side gaps 15 are generated on sides 12s1, 12s2. The leading gap and side gap layers may be comprised of one or more dielectric materials including alumina, silica, and other metal oxides, nitrides, or oxynitrides. On the aforementioned gap layers, there may also be an uppermost metal layer (not shown) such as Ru that promotes the deposition of uniform main pole layers during a subsequent plating process.

Figure 12:
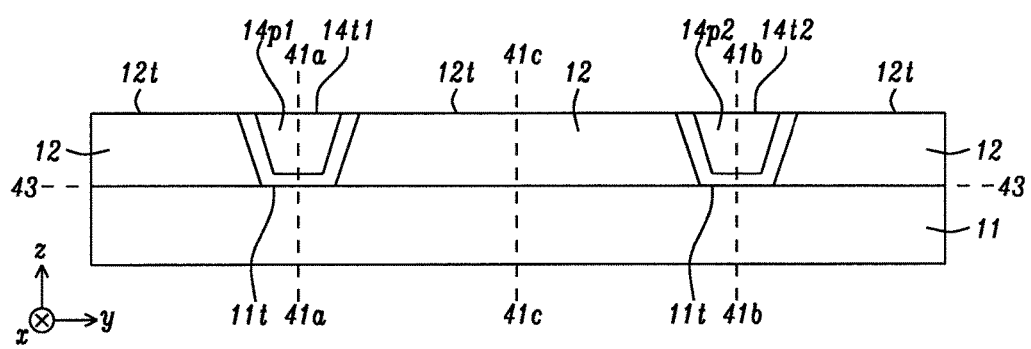

Referring to FIG. 12, first main pole layer 14a with pole tip 14p1, and the second main pole layer 14b with pole tip 14p2 are plated in opening 80a and opening 80b, respectively, by a conventional method and then a chemical mechanical polish (CMP) process is performed to generate trailing sides 14t1, 14t2 that are coplanar with top surfaces 12t of side shields 12. Those skilled in the art will appreciate that at this point, a well known process sequence may be employed to form a taper on the trailing sides such that a down-track distance between each trailing side and plane 42-42 becomes greater with increasing distance from the ABS up to a throat height c (FIG. 13) where trailing side 14t1 connects with trailing side 14t3 as shown at plane 41a-41a.

Figure 13:
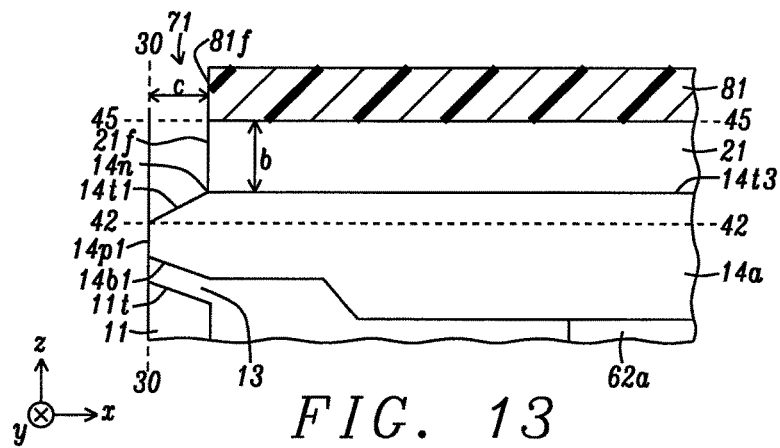
FIGS. 13, 14, 16, and 17 are down-track cross-sectional views illustrating a series of process steps during fabrication of the dual PMR writer in FIG. 7.

With regard to FIG. 13, a down-track cross-sectional view is shown of the structure in FIG. 12 along plane 41a-41a after a dielectric layer 21 is deposited by a PECVD process or the like on tapered trailing side 14t1 and on trailing side 14t3 which extends from a back end 14n of the tapered trailing side towards a back end (not shown) of the main pole. Dielectric layer 21 may be made of one of the materials previously mentioned with respect to gap layer composition, and preferably has a down-track thickness b from about 100 nm to 300 nm. Moreover, a back portion of the first main pole contacts a top surface of BGC 62a. It should be understood that a similar down-track cross-sectional view (not shown) is found along plane 41b-41b except that first pole tip 14p1 is replaced by second pole tip 14p2, first main pole layer 14a is replaced by second main pole layer 14b, and BGC 62a is replaced by BGC 62b. In the exemplary embodiment, the leading side 14b1 of the first main pole is tapered at the ABS and formed substantially parallel to the leading side (top surface) 11t of leading shield 11.

A photoresist layer 81 is coated on dielectric layer 21 and patterned by a conventional photolithography process to form an opening 71 between a front side 81f of the photoresist layer and the eventual ABS 30-30. It should be understood that the ABS is formed with a lapping process after all layers in the write head are fabricated. At this point, plane 30-30 is not an exposed surface and is used only to represent the eventual location of the ABS. Next, a RIE step may be used to remove portions of dielectric layer 21 that are exposed by opening 71. The etch process stops on trailing side 14t1 (and trailing side 14t2) and thereby generates a front side 21f of the dielectric layer that contacts trailing side back end 14n, and contacts front side 81f at plane 45-45 that is aligned orthogonal to plane 30-30 and parallel to top surface 14t3. Front side 21f is at height c from plane 30-30 and is parallel thereto.

Figure 14:
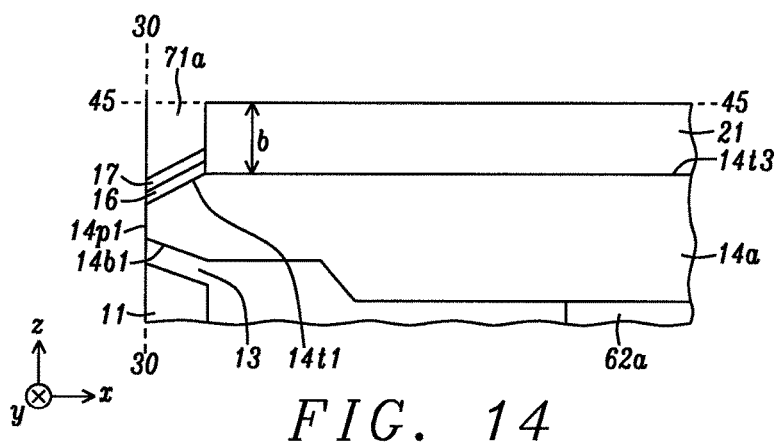

Referring to FIG. 14, the write gap 16 and hot seed layer 17 are sequentially deposited on main pole trailing sides 14t1, 14t2 and thereby leave an opening 71a between a top surface of the hot seed layer and plane 45-45 in the down-track direction, and between plane 30-30 and front side 21f along the x-axis direction. Next, the photoresist layer 81 is removed by a conventional method.

Figure 15:
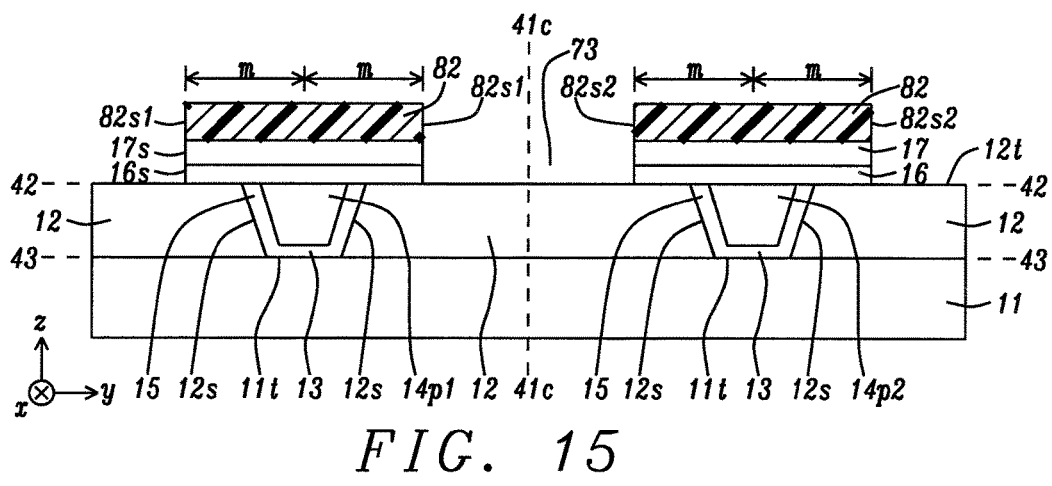

From a perspective along plane 30-30 in FIG. 15, another photoresist layer 82 is coated on hot seed layer 17 and on dielectric layer 21. A photolithography process is employed to generate a pattern in the photoresist layer with sides 82s1 that are separated by the desired cross-track width 2m in the first writer, and with sides 82s2 separated by the cross-track width 2m in the second writer. Then, another RIE process is used to remove portions of the write gap 16 and hot seed layer that are not protected by the photoresist layer, and finally stops at plane 42-42, which corresponds to top surface 12t of the side shields 12. As a result, sides 16s and 17s are formed on the write gap and hot seed layer, respectively, on each side of center plane 41c-41c, and are essentially coplanar with one of the sides 82s1 or 82s2 in the photoresist layer. Moreover, an opening 73 is formed at the center plane that exposes a portion of top surface 12t.

Figure 16:
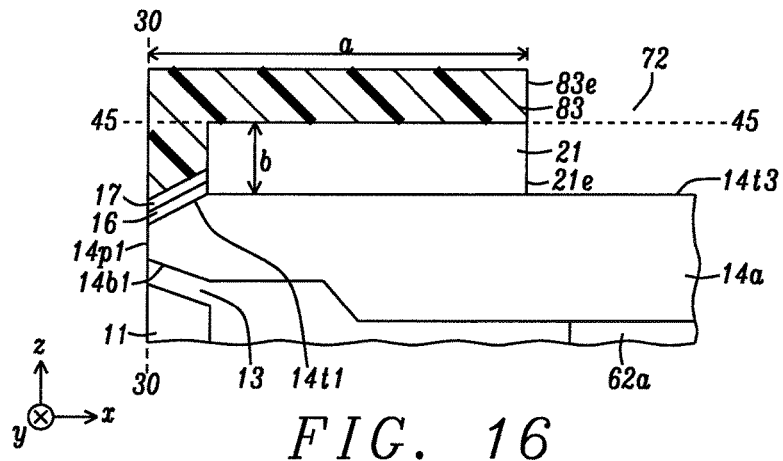

In FIG. 16, a down-track cross-sectional view of the dual PMR writer structure in FIG. 15 is illustrated after the photoresist layer 82 is removed. Another photoresist layer 83 is coated on the hot seed layer 17 and on dielectric layer 21, and fills opening 71a. Thereafter, the photoresist layer is patterned to form an opening 72 behind photoresist layer backside 83e that is at height a from plane 30-30, and above plane 45-45. Subsequently, the opening 72 is expanded downward to main pole trailing side 14t3 by a RIE step that removes portions of dielectric layer 21 that are not protected by photoresist layer 83. Accordingly, backside 21e of the dielectric layer is produced that is essentially coplanar with backside 83e at height a.

Figure 17:
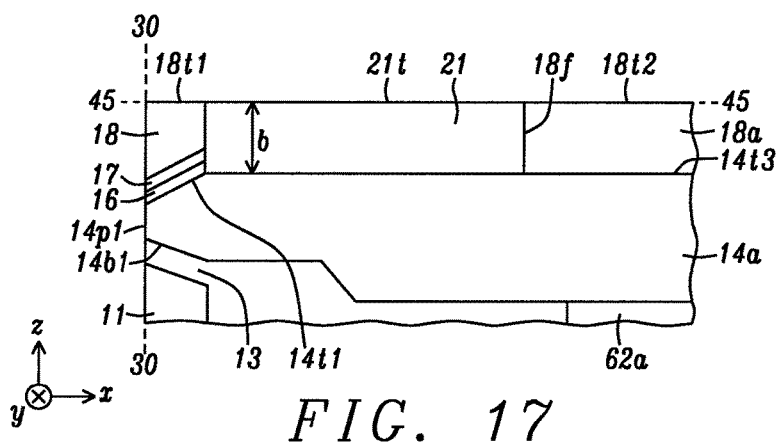

As shown in FIG. 17, photoresist layer 83 is stripped by a well known method and then a magnetic material is plated on hot seed layer 17 to provide trailing shield layer 18 at plane 30-30, and on a portion of trailing side 14t3 to yield TS layer 18b after a CMP process is performed to generate a top surface 18t1 on TS layer 18 that is coplanar with a top surface 18t2 on TS layer 18b, and with top surface 21t on dielectric layer 21.

Figure 18:
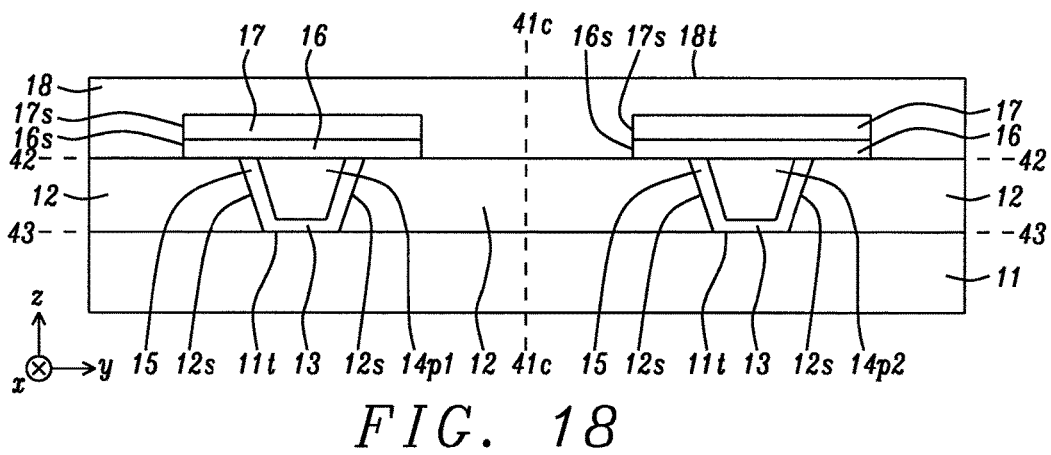

Referring to FIG. 18, a cross-sectional view at plane 30-30 is shown of the writer structure in FIG. 17. TS layer 18 adjoins a top surface and sides 17s of hot seed layer 17, and the sides 16s of write gap 16, and also contacts side shield layer 12 at plane 42-42 along portions thereof that are not covered by the write gap.

Thereafter, the remaining layers in the write head including the PP3 trailing shield, driving coil, and various dielectric layers (not shown) are fabricated by methods well known to those skilled in the art. A key feature is the driving coil has first and second outer portions 61a, 61b formed above first and second main poles 14a, 14b, respectively, and a center portion 61c as depicted in FIGS. 8A-8C that contacts a top of interconnect 65. A final step in the fabrication is to perform a lapping process that exposes plane 30-30 thereby forming the ABS.

Because of narrow coil widths r1 and r2 in the driving coil and bucking coil center portions, respectively, as depicted in FIG. 6B and FIG. 6D, there will be an increase in writer coil DC resistance (DCR). With the same write current amplitude, overshoot and duration selection, higher DCR will lead to higher writer current induced protrusion (Iw-PTP). In a separate patent application, we will disclose a scheme to control the Iw-PTP to minimize the impact on WG protrusion.

While the present disclosure has been particularly shown and described with reference to, the preferred embodiment thereof, it will be understood by those skilled in the art that various changes in form and details may be made without departing from the spirit and scope of this disclosure.

We claim:

1. A dual perpendicular magnetic recording (PMR) writer formed on a slider in a head gimbal assembly (HGA), comprising:
   (a) a first main pole layer having a first pole tip with a leading side and trailing side at an air bearing surface (ABS), and bisected by a first plane that is orthogonal to the ABS;
   (b) a second main pole layer having a second pole tip with a leading side and trailing side at the ABS, and bisected by a second plane that is orthogonal to the ABS, the second plane is a first cross-track width from the first plane;
   (c) a bucking coil (BC) with a front side that is between the first and second planes, recessed from the ABS, and formed below the first and second main pole layers, the bucking coil comprises:
      (1) a BC first outer portion that adjoins a BC center portion proximate to the BC front side and first plane;
      (2) a BC second outer portion that adjoins the BC center portion proximate to the BC front side and second plane, and wherein the BC first and second outer portions and the BC front side form a substantially U shape; and
      (3) the BC center portion with a substantially rectangular shape that extends from the BC front side to a backend that contacts an interconnect;
   (d) a driving coil (DC) with a front side that is between the first and second planes, recessed from the ABS, and formed above the first and second main pole layers, the driving coil comprises:
      (1) a DC first outer portion that adjoins a DC center portion proximate to the DC front side and first plane;
      (2) a DC second outer portion that adjoins the DC center portion proximate to the DC front side and second plane, and wherein the DC first and second outer portions and the DC front side form a substantially U shape; and
      (3) the DC center portion with a substantially rectangular shape that extends from the DC front side to a backend that contacts the interconnect; and
   (e) the interconnect that completes a circuit such that a first write current passing from the BC first outer portion through the BC center portion and interconnect to the DC center portion and then to the DC first outer portion generates flux in the first main pole layer, or a second write current passing from the BC second outer portion through the BC center portion and interconnect to the DC center portion and then to the DC second outer portion generates flux in the second main pole layer for writing to a magnetic medium.

2. The dual PMR writer of claim 1 further comprised of a first write gap contacting the trailing side of the first pole tip at the ABS, a second write gap contacting the trailing side of the second pole tip at the ABS, and a first trailing shield (hot seed) layer adjoining a top surface of each of the first and second write gaps wherein the first and second write gaps, the hot seed layers have a second cross-track width greater than the first cross-track width.

3. The dual PMR writer of claim 2 further comprising:
   (a) a second trailing shield formed on sides of the first and second write gaps, and on sides and top surfaces of the hot seed layers at the ABS;
   (b) a leading shield at the ABS that is separated from the first and second leading sides by a lead gap; and
   (c) side shields adjoining each of two sides of the first and second pole tips at the ABS such that outer portions of the side shields contact the second trailing shield at a third plane that includes the first and second main pole trailing sides, and contacts the leading shield at a fourth plane which is parallel to the third plane thereby forming an all wrap around (AWA) shield structure.

4. The dual PMR writer of claim 1 wherein the first cross-track distance is less than 10 microns.

5. The dual PMR writer of claim 1 wherein a first PMR writer is formed on a first side of a center plane that is equidistant from the first and second planes, and a second PMR writer is formed on a side opposite to the first side of the center plane, the first PMR writer comprises the first main pole layer, BC first outer portion, BC center portion, DC first outer portion and DC center portion, and the interconnect while the second PMR writer comprises the second main pole layer, BC second outer portion, BC center portion, DC second outer portion, DC center portion, and the interconnect.

6. The dual PMR writer of claim 5 wherein the first PMR writer is further comprised of a first back gap connection (BGC) that contacts a bottom surface of the first main pole layer and extends down-track to a first flux return path (RTP) below the BC first outer portion, the first BGC is in a first leading loop for magnetic flux return from a magnetic medium, wherein the first leading loop comprises a leading shield at the ABS, the first RTP, and first BGC, and a portion of the first BGC is formed between the BC first outer portion and the BC center portion.

7. The dual PMR writer of claim 5 wherein the second PMR writer is further comprised of a second back gap connection (BGC) that contacts a bottom surface of the second main pole layer and extends down-track to a second flux return path (RTP) below the BC second outer portion, the second BGC is in a second leading loop for magnetic flux return, the second leading loop comprises a leading shield at the ABS, the second RTP, and second BGC, and a portion of the second BGC is formed between the BC second outer portion and the BC center portion.

8. The dual PMR writer of claim 1 wherein the BC center portion and DC center portion each have a cross-track width less than the first cross-track width.

9. The dual PMR writer of claim 5 wherein either the first PMR writer or the second PMR writer is selected as the better writer in terms of magnetic performance, and is electrically connected to a preamp in the HGA of a hard disk drive (HDD) while the other of the first or second writer is not electrically connected to the HGA.

10. The dual PMR writer of claim 9 wherein the first PMR writer has an electrical connection to the preamp in the HGA comprised of a first connection from the BC first outer portion to a first (W1+) pad, and a second connection from the DC first outer portion to a first (W1-) pad wherein the W1+ and W1- pads interface with the slider on which the dual PMR writer is mounted.

11. The dual PMR writer of claim 9 wherein the second PMR writer has an electrical connection to the preamp in the HGA comprised of a first connection from the BC second outer portion to a first (W2-) pad, and a second connection from the DC second outer portion to a first (W2+) pad wherein the W2+ and W2- pads interface with the slider on which the dual PMR writer is mounted.

12. The dual PMR writer of claim 5 further comprised of a dynamic fly height (DFH) heater formed in one or more dielectric layers that adjoin a side of the interconnect facing away from the ABS, and formed between the bucking coil and the driving coil.

13. The dual PMR writer of claim 12 that is part of a combined read/write head and further comprised of a second DFH heater in a read head portion thereof, wherein a total number of pads to control functionality in the combined read/write head is nine including two pads for contact sensors, two pads for the read head portion, two pads for either the first or second PMR writer, and three pads for the two DFH heaters when the two DFH heaters are in a dual independent mode, or a total of eight pads including two pads for the contact sensors, two pads for the read head portion, two pads for either the first or second PMR writer, and two pads for the DFH heaters when the two DFH heaters are in a parallel heater mode.

14. The dual PMR writer of claim 13 wherein a cross-track width of the BC center portion is less than a cross-track width of the BC first and second outer portions, and a cross-track width of the DC center portion is less than a cross-track width of the DC first and second outer portions to enable a value of <10 microns for the first cross-track width so that a write gap protrusion/read gap protrusion ratio is proximate to 1.

15. The HGA, comprising:
(a) the dual PMR writer according to claim 1; and
(b) a suspension on the slider that elastically supports the dual PMR writer wherein the suspension has a flexure to which the dual PMR writer is joined, a load beam with one end connected to the flexure, and a base plate connected to the other end of the load beam.

16. A magnetic recording apparatus, comprising:
(a) the dual PMR writer according to claim 1;
(b) a magnetic recording medium positioned opposite to the slider on which the dual PMR writer is formed;
(c) a spindle motor that rotates and drives the magnetic recording medium; and
(d) a device that supports the slider, and that positions the slider relative to the magnetic recording medium.

* * * * *